United States Patent Office 3,505,193
Patented Apr. 7, 1970

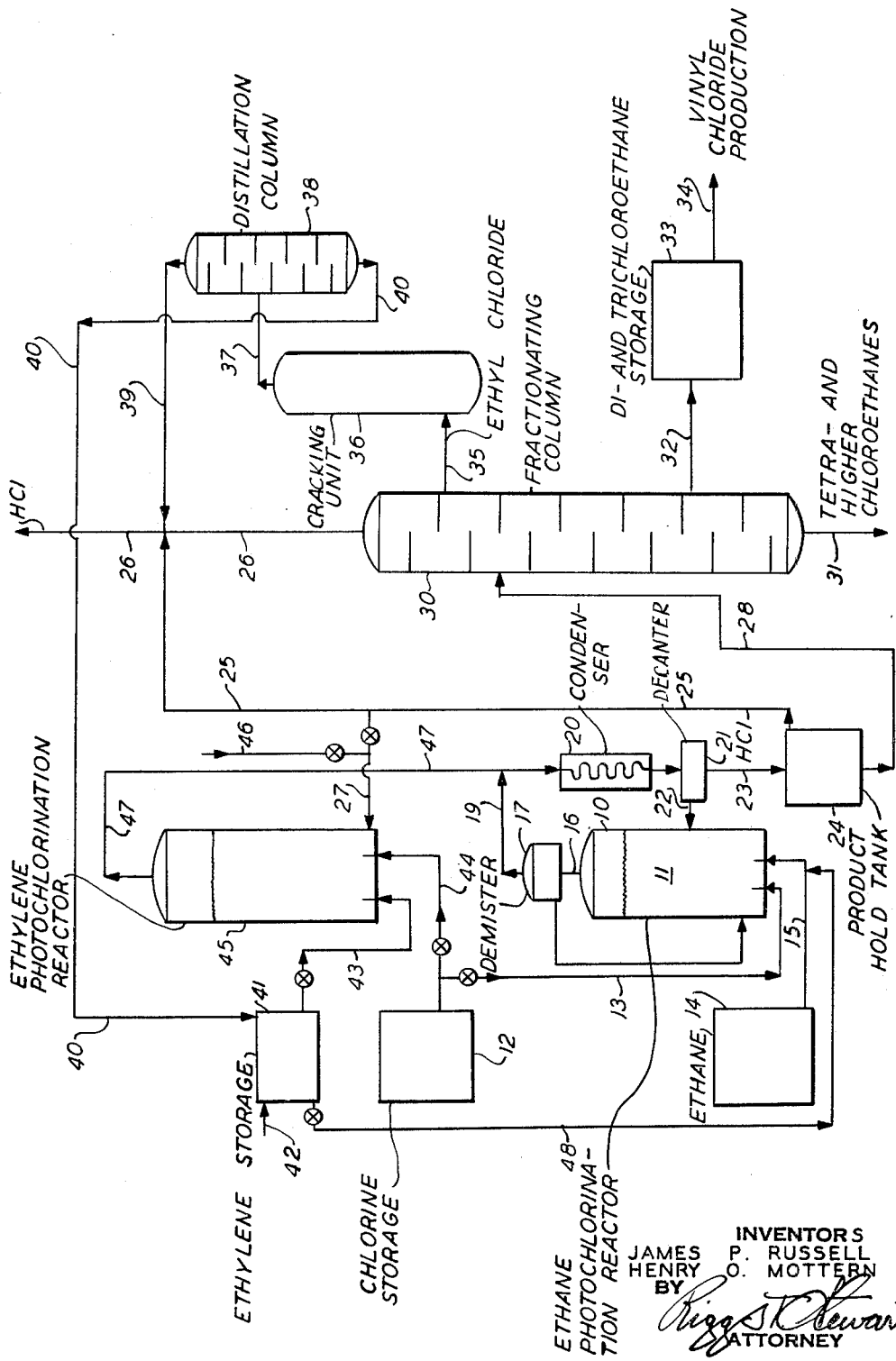

3,505,193
PROCESS OF PREPARING CHLORINATED ETHANES
Henry O. Mottern, Far Hills, and James P. Russell, Berkeley Heights, N.J., assignors to Air Reduction Company, Incorporated, New York, N.Y., a corporation of New York
Filed Mar. 31, 1967, Ser. No. 627,452
Int. Cl. B01j 1/10; C07c 17/00
U.S. Cl. 204—163　　　　　　　　　　　4 Claims

ABSTRACT OF THE DISCLOSURE

Dichloroethane is produced by the photochlorination of ethylene by means of chlorine dispersed in a reaction liquid maintained at a temperature of about 20° to 80° C., the ethylene suitably being obtained by the dehydrochlorination of ethyl chloride produced by the photochlorination of ethane with chlorine.

---

This invention relates to the preparation of organic compounds, more particularly to the manufacture of dichloroethane by the photochlorination of ethylene.

It was proposed in U.S. Patent No. 2,393,509 to Archibald et al. that chlorination of saturated hydrocarbons be effected by passing gaseous hydrocarbons and chlorine through a reaction chamber containing a reaction liquid which aids in the chlorination of the hydrocarbons while exposing the reaction mixture to daylight, sun-light or any chemically-active artificial light. The data summarized in Table I and Table II on page 2 of said patent indicates that the maximum conversion of ethane i.e. 58.1 to 72.1% is achieved when the ratio of ethane to chlorine in the feed is in the volume ratio of 1.18:1 to 1.55:1 that conversion to ethyl chloride ran as high as 95% based on converted ethane. Dichloroethane represents a minor portion of the reaction products and apparently was not considered to be a desirable end-product.

Vinyl chloride is an extremely important starting material for the manufacture of a large variety of commercial plastics. The sharp competitiveness in the vinyl chloride monomer field has generated substantial interest in novel, low-cost methods for the manufacture of this monomer. In view of the fact that almost quantitative yields of vinyl chloride can be obtained by cracking dichloroethane, there is a substantial incentive to develop improved methods for the manufacture of this vinyl chloride precursor. Since ethane is a low cost hydrocarbon, usually valued only as a fuel gas, a process for producing dichloroethane based upon ethane or a material readily prepared from ethane would be very attractive.

It is the object of this invention to provide an improved method for the manufacture of dichloroethane. It is a further object of this invention to provide a process for the production of dichloroethane based upon the use of ethane or a derivative from ethane as the hydrocarbon moiety of this vinyl chloride precursor. These and other objects will be apparent from the detailed description of this invention which follows.

It has now been found that dichloroethane can be readily produced in high yields with very low yields of tri- and tetrachloroethanes by photochlorination of ethylene alone with essentially an equimolar ratio of chlorine. In a preferred embodiment, photochlorination of ethane alone is carried out under carefully controlled conditions to minimize the formation of tri- and higher chloroethanes, segregating dichloroethane and ethyl chloride, subjecting the latter to dehydrochlorination to form ethylene which is then photochlorinated to form dichloroethane. The ethylene may, if desired, be charged together with the ethane to the photochlorination reaction zone.

Reference is made to the accompanying drawing which illustrates a diagrammatic flow plan of the process for the production of dichloroethane in accordance with the present invention based upon the use of ethane or a material readily prepared from ethane as the organic moiety of the desired product.

Referring to the drawing, 10 is a photochlorination reactor vessel containing a body 11 of a reaction liquid, preferably hydrochloric acid of about 30% concentration. Gaseous chlorine is supplied from a storage tank 12 via line 13 and ethane is supplied from storage tank 14 via line 15 to the bottom of reactor vessel 10. Suitable means such as coarse porosity sintered glass thimbles, porous refractory materials or mechanical means such as jets are provided to effect a fine dispersion of the chlorine and ethane as gas bubbles in the body of reaction liquid. The reactor vessel is provided with coils for the circulation of water or other coolant to maintain the reaction liquid at the desired temperature. The reactor vessel is also provided with suitable means for exposing the dispersion of reactants in the reaction liquid to daylight or any chemically active artificial light, preferably fluorescent light which serves as a source of free radicals to initiate the reaction.

The reaction products are taken overhead as gas or vapor via line 16 and passed into demister 17 to separate entrained reaction liquid which is returned to the reaction vessel via line 18. The reaction products are removed from the demister 17 and passed via line 19 through main product condenser 20 to decanter or centrifugal separator for removing hydrochloric acid which is recycled to the body of reaction liquid 11 via line 22. The reaction products are discharged through line 23 into product hold tank 24. 99.5% HCl, traces of water and unreacted ethane are withdrawn from tank 24 through line 25 to line 26 and fed to suitable storage means for recycling in the process or for use in other processes, for example the vapor phase oxychlorination of ethane to form vinyl chloride. If desired, suitable drying and/or purification means can be provided to upgrade the gaseous HCl for recycling or use in other processes. At least a portion of the HCl is withdrawn from line 25 and passed through line 27 to ethylene photochlorination reactor which is described in greater detail below.

The chloroethanes and any residual HCl are withdrawn from tank 24 through line 28 and discharged into fractionating column 30 to effect the desired separation of the various reaction products. HCl is taken overhead via line 26 into which line 25 is connected as described above. Tetra- and higher chloroethanes are removed as bottoms from column 30 via line 31 and passed to storage. The di- and trichloroethanes may be withdrawn as separate fractions and passed to suitable storage means or together as a single fraction by passage through line to suitable storage equipment 33 from which they may be discharged via line 34 to suitable cracking equipment for conversion to vinyl chloride and/or vinyl dichloride.

Ethyl chloride is removed from column 30 and discharged through line 35 into cracking unit 36 where it is heated to about 200 to 600° C. to crack or dehydrochlorinate the ethyl chloride into HCl and ethylene. The reaction products are discharged from the cracking unit 36 through line 37 into distillation column 38 for the separation of ethylene from the HCl which is taken overhead and discharged through line 39 into line 26 where it is combined with the HCl from other sources in the process.

The ethylene is withdrawn from the distillation column 38 and passed through line 40 to ethylene storage means 41 to which ethylene from other sources may be supplied via line 42. In accordance with the present invention, ethylene is charged via line 43 and chlorine is charged via line 44 to ethylene photochlorination reactor vessel 45 which similarly to ethane reactor vessel 10 contains a body of reaction liquid, means for dispersing the ethylene and chlorine as fine gas bubbles in the liquid, temperature control means and means for separating entrained liquid particles and returning the same to the main body of reaction liquid. Since chlorination of ethylene to dichloroethane occurs without formation of HCl, it is necessary to supply a diluent gas to assist in removing chloroethanes formed from the reaction liquid. Gaseous HCl is very suitable for this purpose and may be supplied from the HCl removed from product hold tank through lines 25 and 27 as indicated above or the HCl produced may be passed through line 26 to suitable drying and purification means and then charged via line 46 to line 27 and thence into reactor 45. The reaction products and diluent gas are taken overhead from reactor 45 and passed via line 47 to the main product condenser and thence to product separation and/or storage.

While photochlorination of ethylene alone is preferred in view of the substantially complete conversion thereof to dichloroethane with very low conversions to trichloroethanes, it is also possible to photochlorinate mixtures of ethane and ethylene. Accordingly, ethylene may be charged through line 48 to ethane inlet line 15 or other inlet means into reactor vessel 10 for chlorination.

In accordance with the present invention, the ratio of chlorine to ethylene is preferably mole per mole since this ratio gives an almost quantitative conversion of ethylene to 1,2-dichloroethane. At higher ratios the ethylene is converted quantitatively to mixtures of 1,2-dichloroethane with trichloro- and tetrachloroethanes. When ethylene is photochlorinated with ethane the ratio of chlorine to ethane-ethylene mixture may be as high as about 2.5:1.

When ethane is photochlorinated to produce ethyl chloride which is then converted to ethylene for photochlorination to dichloroethane, control of the ratio of chlorine to ethane is used to reduce polychlorination. Substantially all of the chlorine is converted to ethyl chloride when chlorine in the feed gas does not exceed 25 mole percent. As the amount of chlorine is increase, the amount going to dichloroethane increases until, at 45 mole percent, trichloroethane begins to form. At 47–49.5 mole percent chlorine. The amount of ethane converted to trichloroethanes was 1–3%. Accordingly reduction of trichloroethanes, as an undesirable by-product, to 1% or less requires a ratio of chlorine to ethane not exceeding 45 volume percent or 0.82 mole chlorine per mole of ethane. Chlorination done with 0.9 to 0.975 mole chlorine per mole ethane converted 55–60% of the ethane to ethyl chloride and 17% to dichloroethanes. Trichloroethanes were 1 to 3% and ethane recovered was 20 to 24% of the amount fed.

Various reaction liquids can be used in the reactor vessels but concentrated hydrochloric acid is preferred in spite of the fact that it presents a problem of corrosion of equipment from contact with moist HCl and chlorine. Acetic acid, acetic anhydride, perchloroethylene, perfluoro-tri-n-butyl amine, "Halocarbon Oil 2.3/100" and 85% phosphoric acid may be used but are less suitable for various reasons. The various organic liquids tend to shift product distribution towards tri- and other polychloroethanes. In addition, acetic acid gradually chlorinates to give mixtures of mono-, di-, and trichloroacetic acids. Perchloroethylene reacts almost quantitatively with chlorine to produce hexachloroethane. Acetic anhydride reacts with the HCl produced to give acetyl chloride which comes over with the products. The 85% phosphoric acid gave results which are comparable with those obtained with concentrated HCl but being a very viscous liquid, the space velocity has to be maintained at a very low level to avoid foaming and excessive carry-over of solvent.

Gas flow rates may be varied between about 100 and 1000 liters per liter of HCl soln. per hour. At low gas rates there is a tendency for dichloroethanes and higher chloroethanes to condense in the dispersion and settle out in the reactor vessel leading to the formation of larger quantities of tri- and higher chloroethanes. At higher gas flow rates all products of chlorination are carried overhead in the vapor phase permitting better control of the chlorination. Since no HCl is formed in the photochlorination of ethylene it is necessary to add a diluent gas to help carry the reaction products out of the reactor vessel. 95–100% hydrogen chloride is the preferred diluent since it is available from the photochlorination of ethane. From about 0.75 to 1.5 moles of 95–100% HCl per mole of ethylene in the feed is supplied to the reactor vessel. The maximum gas flow rate is governed by the ability of the reactor system to tolerate the gas flow without loss of reaction liquid overhead by entrainment.

In the photochlorination of ethylene or ethane-ethylene mixtures dispersed in concentrated hydrochloric acid the temperature of the dispersion is controlled with cooling coils to between about 20° and 80° C. Where it is desired to recover substantially anhydrous hydrogen chloride, it is preferred to maintain the reaction liquid temperature below 70° C., preferably in the range of from 35° to 65° C.

The pressure used during photochlorination has no effect upon the reaction rate or product distribution so long as it is not so high as to cause condensation of any chloroethane products at the temperature of chlorination. Accordingly, reaction pressures may be in the range of from about 0.5 to 2 atmospheres.

Ethane, ethylene and ethane-ethylene mixtures photochlorinate with no significant decrease in conversion to chloroethanes at incident light intensities from about 440 foot candles down to as low as 85 foot candles, the latter corresponding to the attenuation of a 500 foot-candle light source passing through 7 inches of a gas-liquid dispersion. It was found that as the light intensity was decreased, the vapor temperature increased from about 140° to about 325° C. indicating that more reaction was taking place in the vapor phase. The only significant difference in product distribution that occurred as the light intensity decreased was a decrease in amount of trichloroethane formed, from about 9.1 wt. percent to about 4.0 wt. percent. Daylight, sunlight or any chemically-active artificial light can be used to provide such incident light intensities. Fluorescent light tubes are the preferred light source from the standpoint of installation cost, power consumption and durability.

While ethylene from any source maybe photochlorinated in accordance with the present invention, it is particularly advantageous to integrate the photochlorination of ethane therewith since the latter can be readily controlled to yield ethyl chloride and the desired dichloroethanes with very small amounts of higher chloroethanes. The ethyl chloride formed is easily separated from the reaction products and dehydrochlorinated to ethylene by techniques well known to those skilled in the art. The overall yield of dichloro- and trichloroethanes from ethane utilizing such an integrated process can be as high as 96–98% of the former and as little as 2–4% of the latter.

The following examples are illustrative of the present invention of photochlorinating ethylene alone or integrated with the photochlorination of ethane to form high yields of dichloroethane and very low yields of trichloro- and higher chloroethanes. The several runs were carried out in a reactor system as illustrated in the accompanying drawing. The reactor tube consisted of a 48 inch by 2 inch Pyrex tube which was fitted at the bottom with a drain stopcock, two gas inlet tubes (three when gaseous hydrogen chloride was also fed) with coarse porosity sintered glass thimbles, which reactor tube was positioned between two 48 inch 40 watt fluorescent light tubes in such a manner that the light tubes and the reactor tube formed an isosceles triangle having a 5 inch base and 3 inch sides with the reactor tube at the apex. Table I below summarizes the reaction conditions maintained in the various runs and the results that were obtained.

TABLE I

| Run No. | T., °C. | Flow vel. (l. gas/ l. soln./ hr.) | Feed rate (moles/hr.) | | | | Init. vol. percent $Cl_2$ reacts. | Mole ratio chlorine: hydrocarbons (calcd. from products) | Mole percent product distribution | | | | | Percent conv. ethane | Ratio 1,1:1,2 $C_2H_4Cl_2$ |
|---|---|---|---|---|---|---|---|---|---|---|---|---|---|---|---|
| | | | $Cl_2$ | $C_2H_6$ | $C_2H_4$ | HCl | | | $C_2H_5$ | $C_2H_5Cl$ | $C_2H_4Cl_2$ | $C_2H_3Cl_3$ | $C_2H_2Cl_4$ | | |
| 174 | 38 | 525 | 7 | 0 | 7 | 7 | 50 | 0.94 | 8.3 | -------- | 85.8 | 5.9 | -------- | *92 | -------- |
| 176 | 48 | 525 | 7 | 0 | 7 | 7 | 50 | 0.97 | 6.0 | -------- | 92.5 | 1.6 | -------- | *93 | -------- |
| 178 | 58 | 525 | 7 | 0 | 7 | 7 | 50 | 0.94 | 7.1 | -------- | 91.3 | 1.7 | -------- | *92.8 | -------- |
| 180 | 48 | 450 | 9 | 3 | 3 | 3 | 60 | 1.62 | 10.7 | 32.4 | 41.0 | 15.0 | 0.3 | 81.5 | 0.71 |
| 182 | 48 | 450 | 9 | 3 | 3 | 3 | 60 | 1.70 | 2.3 | 25.9 | 54.8 | 14.7 | 0.6 | -------- | 0.39 |
| 184 | 48 | 450 | 9 | 3 | 3 | 3 | 60 | -------- | 4.9 | 22.0 | 58.8 | 11.2 | -------- | 90 | 0.37 |
| 186 | 48 | 425 | 9 | 4 | 2 | 2 | 60 | 1.83 | 4.3 | 24.2 | 55.7 | 14.4 | 0.4 | 90 | 0.88 |
| 188 | 48 | 475 | 9 | 2 | 2 | 4 | 60 | 2.06 | 2.5 | 12.6 | 63.2 | 20.9 | 0.8 | -------- | 0.33 |
| 190 | 48 | 500 | 8 | 4 | 4 | 4 | 50 | 1.33 | 9.2 | 33.2 | 51.3 | 6.9 | -------- | 76 | 0.2 |
| 192 | 48 | 500 | 8 | 4 | 4 | 4 | 50 | 1.37 | 16.3 | 32.7 | 46.2 | 4.3 | -------- | 67.5 | 0.2 |
| 194 | 48 | 475 | 8 | 5 | 3 | 3 | 50 | 1.42 | 14.9 | 33.0 | 43.6 | 6.6 | -------- | 63 | -------- |
| 196 | 48 | 525 | 8 | 3 | 5 | 5.5 | 50 | 1.55 | 14.7 | 20.4 | 59.9 | 5.2 | -------- | 67 | 0.09 |
| 198 | 48 | 435 | 10 | 2.5 | 2.5 | 2.5 | 66.7 | 2.06 | 3.8 | 13.0 | 59.0 | 24.7 | 1.7 | 97 | 0.57 |
| 202 | 48 | 475 | 8 | 5 | 3 | 3 | 50 | 1.38 | 18.8 | 29.3 | 46.1 | 5.8 | -------- | 74 | 0.37 |
| 122 | 37 | 200 | 4 | 4 | -------- | -------- | 50 | 1.97 | 20.4 | 60.5 | 16.9 | 1.0 | -------- | 79.6 | 2.90 |
| 136 | 37 | 275 | 6 | 5 | -------- | -------- | 54.6 | 1.16 | 18.7 | 53.0 | 23.7 | 4.5 | -------- | 81.3 | 3.74 |
| 116 | 37 | 150 | 4 | 2 | -------- | -------- | 66.7 | 3.08 | 0.2 | 14.8 | 58.1 | 23.8 | 0.2 | 99 | 3.62 |

*Percent $C_2H_4$.

Run Nos. 174, 176 and 178 show the very high yields of the desired dichloroethane and the very low yields of trichloro- and higher chloroethanes that are obtained when ethylene alone is subjected to photochlorination. Other runs, particularly Run No. 196 demonstrate that mixtures of ethylene and ethane may be photochlorinated to yield as high as 59.9 mole percent $C_2H_4Cl_2$ with only 5.2 mole percent of $C_2H_3Cl_3$. This is in sharp contrast to Run No. 116 in which ethane alone was photochlorinated to obtain maximum conversion and yielded 58.1 mole percent dichloroethane and in addition 23.8 mole percent of trichloroethane.

The advantages of the process of the present invention are particularly outstanding when ethane is photochlorinated under carefully controlled conditions (Run Nos. 122 and 136) to give very high yields of ethyl chloride which is then dehydrochlorinated to ethylene and photochlorinated alone as per Run Nos. 174, 176 and 178. It is clear from the above data that this combination of operations would give maximum yields of the desired dichloroethanes with very low yields of trichloro- and higher chloroethanes.

The present invention is not to be limited to the foregoing examples since numerous variations are possible without departing from the scope of the following claims.

What is claimed is:

1. The process of preparing dichloroethane which comprises dispersing ethylene with a substantially equimolar amount of chlorine and anhydrous hydrogen chloride as fine gas bubbles in a body of hydrochloric acid maintained at a temperature of about 20° to 80° C., subjecting this dispersion to the action of actinic light serving as a source of free radicals to initiate the reaction between the ethylene and chlorine, maintaining the flow velocity of the reactants between about 100 and 1000 liters per liter of reaction liquid per hour whereby the reaction products are rapidly removed from the reaction liquid and recovering dichloroethane from the reaction products.

2. The process as defined in claim 1 in which the reaction liquid is concentrated hydrochloric acid, the reaction temperature is in the range of about 35° to 65° C. and the light is fluorescent light.

3. The process as defined in claim 1 in which ethane is also photochlorinated in admixture with the ethylene.

4. The process of preparing dichloroethane as defined in claim 1, wherein at least part of the ethylene is prepared by dispersing ethane and chlorine as fine gas bubbles in a body of a hydrochloric acid maintained at a temperature of about 20° to 80° C., subjecting the dispersion of ethane and chlorine to the action of actinic light serving as a source of free radicals to initiate the reaction between ethane and chlorine, maintaining the flow velocity of the reactants between about 100 and 1000 liters per liter of reaction liquid per hour whereby the reaction products are rapidly removed from the reaction liquid, combining the reaction products from the ethane chlorination with the reaction products from the ethylene chlorination, recovering dichloroethanes and ethyl chlorides from the combined reaction products, heating the ethyl chloride to a temperature of about 200° to 600° C. to dehydrochlorinate it and convert it to ethylene, and dispersing said last-mentioned ethylene in said hydrochloric acid.

References Cited

UNITED STATES PATENTS 2,393,509   1/1946   Archibald et al. _____ 204—163
2,589,689   11/1949   Governale et al. _____ 204—163
2,606,867   8/1952   Pianfetti et al. _____ 204—163

BENJAMIN R. PADGETT, Primary Examiner